US009730306B2

(12) United States Patent
Molz

(10) Patent No.: US 9,730,306 B2
(45) Date of Patent: Aug. 8, 2017

(54) OPTIMIZED THERMAL NOZZLE AND METHOD OF USING SAME

(71) Applicant: OERLIKON METCO (US) INC., Westbury, NY (US)

(72) Inventor: Ronald J. Molz, Ossining, NY (US)

(73) Assignee: OERLIKON METCO (US) INC., Westbury, NY (US)

(*) Notice: Subject to any disclaimer, the term of this patent is extended or adjusted under 35 U.S.C. 154(b) by 0 days.

(21) Appl. No.: 14/650,360

(22) PCT Filed: Dec. 19, 2013

(86) PCT No.: PCT/US2013/076603

§ 371 (c)(1),
(2) Date: Jun. 8, 2015

(87) PCT Pub. No.: WO2014/120357

PCT Pub. Date: Aug. 7, 2014

(65) Prior Publication Data

US 2015/0319833 A1 Nov. 5, 2015

Related U.S. Application Data

(60) Provisional application No. 61/759,071, filed on Jan. 31, 2013.

(51) Int. Cl.
*B23K 10/00* (2006.01)
*H05H 1/28* (2006.01)
*H05H 1/34* (2006.01)

(52) U.S. Cl.
CPC ................ *H05H 1/28* (2013.01); *H05H 1/34* (2013.01)

(58) Field of Classification Search
CPC ... H05H 1/28; H05H 1/34; H05H 1/26; B23K 10/00
(Continued)

(56) References Cited

U.S. PATENT DOCUMENTS 3,390,292 A 6/1968 Perugini
3,756,511 A 9/1973 Shinroku et al.
(Continued)

FOREIGN PATENT DOCUMENTS

CA 5054958 1/1992
DE 34 34 701 6/1986
(Continued)

OTHER PUBLICATIONS

International Search Report (Form PCT/ISA/210) in PCT/US2013/076603.

(Continued)

*Primary Examiner* — Mark Paschall
(74) *Attorney, Agent, or Firm* — Greenblum & Bernstein, P.L.C.

(57) ABSTRACT

Nozzle for thermal spray gun, thermal spray gun and method of optimizing nozzle of thermal spray gun. The nozzle includes a central bore comprising a conical bore and a cylindrical bore. The conical bore is delimited by a conical wall surface in a conical bore section, the cylindrical bore is delimited by a cylindrical wall surface in a cylindrical bore section, and the conical bore section and the cylindrical bore section are structured so that heat is removed more rapidly from the conical wall than from the cylindrical wall.

17 Claims, 5 Drawing Sheets

(58) Field of Classification Search
USPC ......... 219/121.49, 121.5, 121.51, 121.52, 75
See application file for complete search history.

(56) References Cited

U.S. PATENT DOCUMENTS

| | | | | |
|---|---|---|---|---|
| 4,242,562 | A * | 12/1980 | Karinsky | H05H 1/28 219/121.36 |
| 4,841,114 | A | 6/1989 | Browning | |
| 5,340,961 | A | 8/1994 | Bebber et al. | |
| 6,268,583 | B1 * | 7/2001 | Yamaguchi | B23K 10/00 219/121.49 |
| 7,030,336 | B1 | 4/2006 | Hawley | |
| 8,575,510 | B2 * | 11/2013 | Laurisch | H05H 1/34 219/121.48 |
| 9,095,037 | B2 * | 7/2015 | Hollberg | |
| 2013/0075372 | A1 | 3/2013 | Hollberg | |

FOREIGN PATENT DOCUMENTS

| | | |
|---|---|---|
| DE | 10 2010 006786 | 8/2011 |
| SE | 507344 | 5/1998 |
| WO | 2013/112177 | 8/2013 |

OTHER PUBLICATIONS

International Preliminary Report on Patentability (Form PCT/IB/373) in PCT/US2013/076603.
China Search Report/Office Action conducted in counterpart China Appln. No. 201380070793.8 (Oct. 8, 2016).
European Search Report/Office Action conducted in counterpart European Appln. No. 13873561 (Jun. 8, 2016).

* cited by examiner

OPTIMIZED THERMAL NOZZLE AND METHOD OF USING SAME

CROSS-REFERENCE TO RELATED APPLICATIONS

The present application is an International Application that claims priority to U.S. Provisional Application No. 61/759,071 filed Jan. 31, 2013, the disclosure of which is expressly incorporated by reference herein in its entirety.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

Conventional plasma gun nozzles (anodes) used in thermal spray applications have a limited life. As long as the plasma voltage is maintained in a predefined range for proper operation, the nozzle is operational. However, as exposure to the plasma arc deteriorates the nozzle wall, the plasma voltage drops, as does the life of the nozzle. Typically, the nozzle life is under 40 hours. Moreover, during gun operation the walls are subjected to a number of other conditions that result in voltage decay and arc instability, e.g., cracking of the Tungsten lining used in some nozzle designs.

What is needed is a nozzle and method of producing such a nozzle that minimizes the affects of conditions that result in voltage decay and arc instability.

Generally, there are two key characteristics for controlling the attachment of the plasma arc to the nozzle walls. Charge concentration, as described, e.g., in U.S. Pat. Nos. 7,030,336 and 4,841,114, the disclosures of which are expressly incorporated by reference herein in their entireties, can be used to drive the attachment of the plasma arc to a particular location. However, to control plasma arc attachment in this manner requires a change in gun geometry that could affect the operating conditions for existing plasma guns used to spray a number of existing applications.

The second characteristic for controlling the plasma arc attachment point is the thermal state of the nozzle walls. It has been found that hotter surfaces and boundary conditions are more attractive to the plasma arc, while cooler surfaces and boundary conditions are less attractive to the plasma arc, see, e.g., International Publication No. PCT/US2012/022897, the disclosure of which is expressly incorporated by reference herein in its entirety. Thus, in this manner, it is possible to improve gun performance in terms of voltage stability and controlling voltage decay by applying the thermal management techniques to provide preferred wall conditions for plasma arc attachment.

Heretofore, the design of plasma gun nozzles has been achieved primarily through empirical data, especially with respect to the cooling. These designs have concentrated on providing maximum cooling affects uniformly in the region of plasma arc attachment along the entire plasma nozzle bore.

SUMMARY OF THE EMBODIMENTS

Embodiments of the invention are directed to a nozzle for a thermal spray gun. The nozzle includes a central bore comprising a conical bore and a cylindrical bore. The conical bore is delimited by a conical wall surface in a conical bore section, the cylindrical bore is delimited by a cylindrical wall surface in a cylindrical bore section, and the conical bore section and the cylindrical bore section are structured so that heat is removed more rapidly from the conical wall than from the cylindrical wall.

According to embodiments, the conical bore section and the cylindrical bore section can include copper.

In accordance with embodiments of the invention, at least part of the conical wall surface and the cylindrical wall surface are formed from one of tungsten, molybdenum, silver or iridium.

According to other embodiments, a radial thickness of the conical bore section can be greater than that of the cylindrical bore section.

Further, the nozzle can also include a plurality of radially extending fins surrounding at least part of the conical bore section and the cylindrical bore section. The fins can be arranged to form cooling water channels. Moreover, bases of the cooling water channels can be radially outside of an outer wall surface of the cylindrical bore section. Alternatively or additionally, bases of the cooling water channels may be radially outside an outer wall surface of the conical bore section. Still further, at least a part of an outer wall surface of the conical bore section and at least a part of the outer wall surface of the cylindrical bore section can be parallel to each other. In embodiments, at least a common section of each fin surrounding at least the conical bore section can be removed, and the nozzle can further include a continuous water jacket arranged in the removed common section to form closed water channels over at least the conical bore section. The continuous water jacket may include at least one of copper, brass, steel, or ceramic.

In further embodiments, the conical bore section can be structured and arranged so that cooling water passes through the conical bore section at a greater velocity than cooling water passes through the cylindrical bore section.

According to still other embodiments of the invention, the cylindrical bore section can be structured and arranged so that the cooling water passing through the cylindrical bore section is stagnant in relation to the cooling water passing through the conical bore section.

Embodiments of the invention are directed to a thermal spray gun. The thermal spray gun includes a nozzle having a conical bore and a cylindrical bore. The nozzle is structured so that an average surface temperature of the conical bore is at least about 100° C. cooler than an average surface temperature of the cylindrical bore.

According to embodiments of the instant invention, the thermal spray gun can include a cooling water system to supply cooling water at a rear of the nozzle and to remove the cooling water at a front of the nozzle. Further, the conical bore can be arranged at a rear of the nozzle and the cylindrical bore is arranged at a front of the nozzle. Alternatively or additionally, channels can be formed in a rear of the nozzle to guide the cooling water through the rear of the nozzle at a velocity greater than at a front of the nozzle. Further, the front of the nozzle may be formed so that the cooling water surrounding the cylindrical bore acts as an insulator.

Embodiments of the invention are directed to a method of cooling a nozzle in a thermal spray gun nozzle having a conical bore and a cylindrical bore. The method includes supplying cooling water from a rear of the nozzle to a front of the nozzle to cool wall surface temperatures of the conical bore and a cylindrical bore. The front and rear of the nozzle are structured so that heat is removed more rapidly from a wall surface of the conical bore than from a wall surface of the cylindrical bore.

According to embodiments, an average wall surface temperature of the conical bore can be at least about 100° C. cooler than an average wall surface temperature of the cylindrical bore.

In accordance with still yet other embodiments of the present invention, the cooling water can be supplied along at least one surface surrounding the conical section at a velocity greater than the cooling water is supplied along at least one surface surrounding the cylindrical section.

Embodiments of the invention are directed to a nozzle for a plasma gun. The plasma gun can be, e.g., used in thermal spray application or can be, e.g., a plasma rocket, a plasma torch or a plasma generator.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
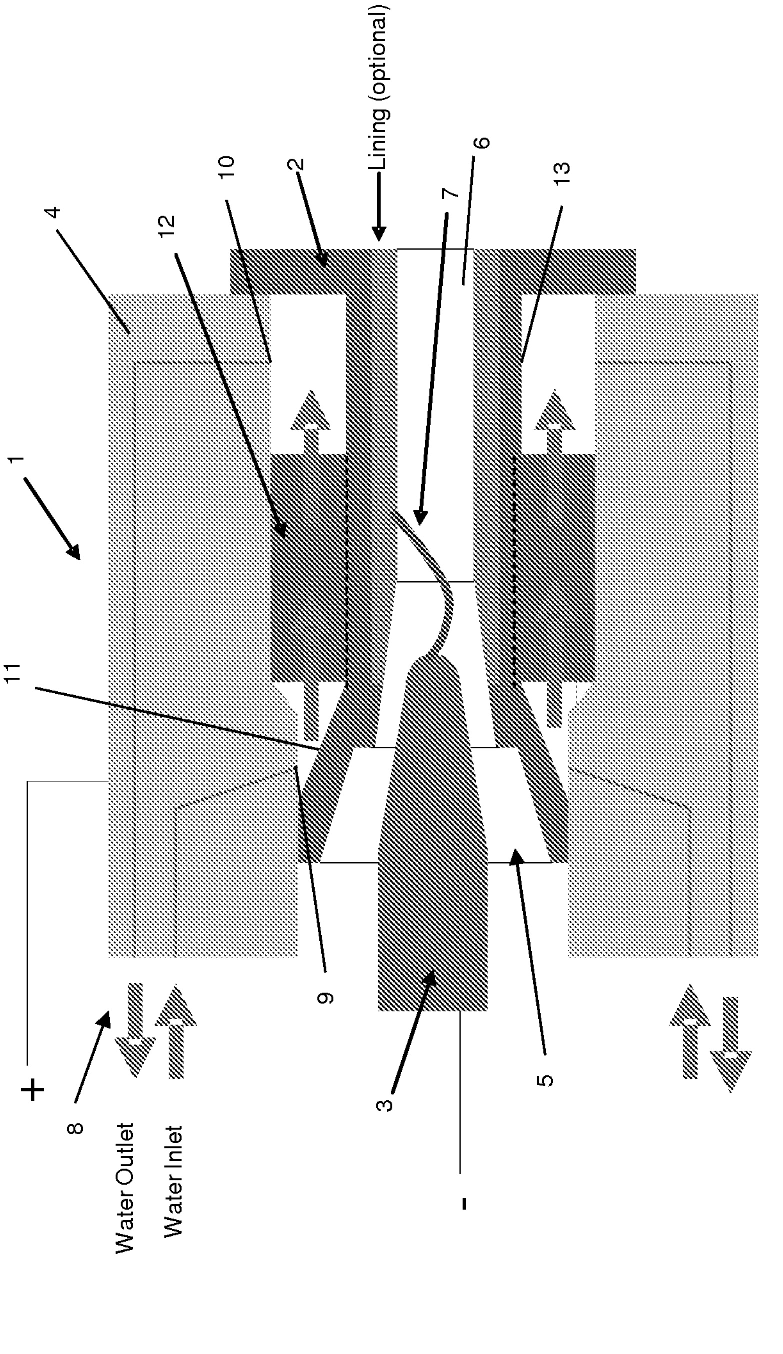
FIG. 1 illustrates a conventionally designed nozzle for a plasma spray gun.

FIG. 1 illustrates a front gun body 1 of a conventional plasma spray gun that includes a conventional plasma nozzle 2, a cathode 3 and a water cooling system 4. The conventional plasma spray gun can be, e.g., an F4 MB-XL or 9 MB plasma gun manufactured by Sulzer Metco, an SG100 plasma gun manufactured by Progressive Technologies, or any typical conventional plasma gun exemplified by having a single cathode and a non-cascading anode/plasma arc channel. Plasma nozzle 2 can be made of a material with high heat transfer characteristics, e.g., from copper only or a copper nozzle can include a lining, e.g. a tungsten lining, a molybdenum lining, and high Tungsten alloy lining, a silver lining or an iridium lining, to improve performance. A plasma is formed in plasma nozzle 2 by passing a current through a gas, typically, e.g., Ar, $N_2$, He, or $H_2$ and mixtures thereof, creating a plasma arc 7. To create the current, cathode 3 is connected to the negative side of a dc power source and nozzle 2, acting as an anode, is connected to the positive side. Plasma nozzle 2 includes a conical bore 5 in which cathode 3 is accommodated and a cylindrical bore 6 in which plasma arc 7 preferably attaches.

In initial operation, plasma arc 7 may travel some distance down cylindrical bore 6 before attaching to the nozzle wall, which produces the highest plasma voltage. By way of non-limiting example, the initial attachment point for plasma arc 7 can be between the first one-third and one-half of cylindrical bore 6 downstream of conical bore 5, and the plasma voltage at the wall is preferably greater than 70V at a given operating parameter. Other parameters will result in different voltages depending upon gasses, hardware geometry, current, etc. As the surface of nozzle wall 2 wears and deteriorates, plasma arc 7 becomes attracted further upstream until plasma arc 7 eventually attaches to the wall of conical bore 5, at which time the voltage drop is large enough to require nozzle 2 to be replaced. The wall within conical bore 5 is an undesired area of plasma arc attachment, where the plasma voltage is less than 70V at a given operating parameter. Again, other parameters will result in different voltages depending upon gasses, hardware geometry, current, etc.

To cool the nozzle, radially extending from an outer peripheral surface of nozzle 2 is a plurality of fins 12. Fins 12 also extend in a longitudinal direction of nozzle 2 to surround a point at which conical bore 5 and cylindrical bore 6 meet, as well as portions of conical bore 5, e.g., to surround about one-half of a length of conical bore 5, and cylindrical portion 6, e.g., to surround the arc attachment region. When a tungsten lining is provided, fins 12 can be arranged to extend, e.g., from a beginning of the lining forming a portion of the wall in conical bore 5 to an end of predetermined arc attachment region surrounding cylindrical bore 6.

As extremely high temperatures result from operating the plasma gun, e.g., a peak average wall temperatures of 700-800° K in the nozzle bore, water cooling system 4 is arranged to cool nozzle 2 with circulating water. Water cooling system 4 includes a water cooling path 8 that enters from a rear of the gun body, is directed around the outer perimeter of nozzle 2 and through cooling fins 12 before exiting. In particular, water cooling system 8 has at least one water inlet port 9 to supply cooling water from a supply to the outer periphery of nozzle 2 and has at least one water outlet port 10 through which the water cooling the outer periphery of nozzle 2 exits and is returned to the supply. Water inlet port 9 supplies cooling water to contact an outer peripheral surface 11 of nozzle 2 surrounding a part of conical bore 5. The cooling water is then guided through fins 12 to contact and cool the periphery in which fins 12 are located and then into an area to contact and cool the peripheral surface 13 surrounding a part of cylindrical bore 6. The cooling water is generally supplied at a temperature of between 10° C. and 22° C., and preferably between 16° C. and 18° C., in order to effect a 25-35° K temperature rise.

With normal operation of the plasma gun depicted in FIG. 1, the plasma voltage will decay as the nozzle wall surface becomes worn and pitted providing anodic attachments via charge concentration. Over time, these attractive forces will disadvantageously drive the arc into the conical section, resulting in a voltage decay indicative of the end of the useful life of the nozzle.

Embodiments of the invention seek to prolong the life of the nozzle by controlling the plasma arc attachment region through thermal dynamic affects. The embodiments utilize the above-described behavior to manipulate the plasma arc by controlling the wall temperature of the nozzle. In particular, the embodiments are based in part on the finding that hotter surfaces provide conducive locations for plasma arc attachment while cooler surfaces tend to be less attractive to the plasma arc.

Based on knowledge gained from operating computational fluid dynamics (CFD) models of plasma guns, the inventor has found that for most plasma guns the average wall temperatures in the region of plasma arc attachment, i.e., the forward half of the conical bore and the rear half of the cylindrical bore, are relatively uniform, e.g., about a 50° C. difference or less. As conventional plasma nozzles are primarily constructed of copper, which has a good thermal conductivity, this finding was not surprising. However, the inventor found that, according to embodiments of the invention, advantages can be attained through cooling of the nozzle in a manner to generate thermal differences in average temperature along the bore, i.e., from the bore wall in the rear section of the conical bore to the bore wall in the front section of the cylindrical bore, that are, e.g., greater than 50° C., greater than about 75° C., at least about 100° C., and even greater than about 200° C., and/or within a range of between 75° C. and 225° C., and preferably between 100° C. and 200° C.

Figure 2:
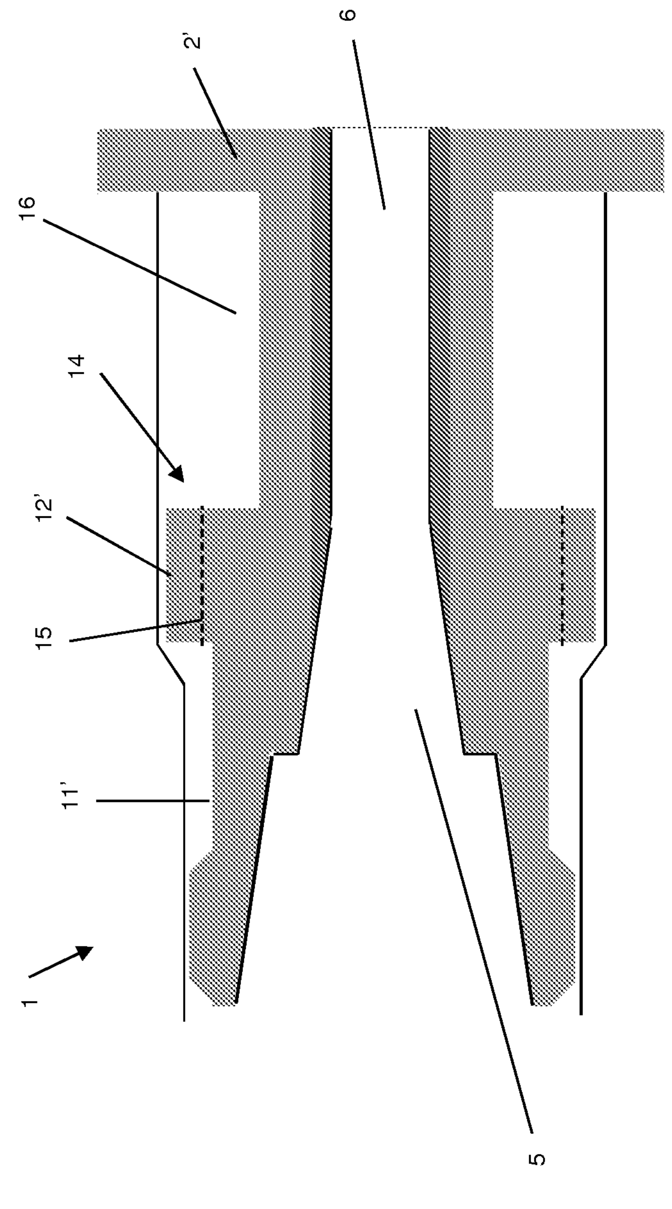
FIG. 2 illustrates an embodiment of a nozzle for use with a plasma spray gun.

An embodiment of a nozzle 2' constructed according to the inventor's implementation of thermal management is depicted in FIG. 2. While nozzle 2' is structurally distinct from nozzle 2, the use of nozzle 2' in place of nozzle 2 in the conventional plasma gun does not change the operational characteristics of the plasma gun, except to the extent that the nozzle life is increased with nozzle 2' as compared to nozzle 2. In the illustrated embodiment, nozzle 2' is constructed in a manner to keep the conical bore 5 cooler in relation to cylindrical bore 6. According to this exemplary embodiment, the plasma arc 7, as in the conventional nozzle design, preferably attaches in the back end of cylindrical bore 6, e.g., the back one-third to one-half of the bore, and remains there for as long as possible.

Nozzle 2' was constructed to build up the copper material surrounding conical bore 5 so that the added high thermal mass of copper surrounds conical bore 5 to draw off and conduct heat away from the wall of conical bore 5. Moreover, as the amount of copper surrounding conical bore 5 increases, the outer peripheral surface 11' surrounding conical bore 5 can structured to be coaxial with cylindrical bore 6 so that the cross-sectional area of the water path or channel around conical bore 5 is correspondingly reduced. This reduced path or channel results in increased velocity of the water flowing through the path or channels surrounding conical bore 5, thereby achieving optimal cooling of the walls of conical bore 5.

In the area of the knee or point at which conical bore 5 meets cylindrical section 6, nozzle 2' is constructed so that a further change in the cooling setup occurs. As compared to the conventional nozzle 2, an area 14 with fins 12' merely extends in the longitudinal direction from the increased copper portion (or from the beginning of the tungsten lining) surrounding part of conical bore 5 to a point, depending upon thermal dynamics of nozzle 2' and the plasma arc, at, just before, or just beyond the point at which conical bore 5 and cylindrical bore 6 meet. However, rather than radially extending from the outer peripheral surface of cylindrical bore 6, as in nozzle 2, copper material is also built up in area 14 to form a peripheral surface 15 to at least meet and preferably exceed the radial build up of peripheral surface 11'. As further illustrated in FIG. 2, fins 12' can be arranged to radially extend from peripheral surface 15 of the copper build up, so that the water guided into the reduced channel surrounding conical bore 5 is guided between, and preferably guided up to peripheral surface 15 and then between, fins 12'. Further, while fins 12' can radially extend to the surface of the bore in the plasma gun to receive nozzle 2', it may be advantageous to construct fins 12' to be radially shorter than the fins 12 in nozzle 2 so that, as the cooling water entering through water inlet 8 increases its velocity in the channels surrounding conical bore 5, the cooling water can flow between and over fins 12' and into a wide water outlet groove 16 in the remaining area surrounding cylindrical bore 6.

As the velocity of the cooling water slows as the cooling water enters the larger geometry of wide water outlet groove 16, this area can become somewhat of a stagnant water zone. Further, as water is actually a good insulator, the amount of copper in the nozzle wall and/or around the tungsten lining, should be sufficient to allow heat to travel laterally through the copper and away from the "instantaneous" plasma arc 7 attachment point in order to prevent melting of the copper and/or tungsten. However, because of water's insulative effect and as the cooling water becomes somewhat stagnant over cylindrical bore 6, the heat reduction on the wall surface at the area of the plasma arc attachment due to the cooling water can be further reduced, if desired, by further reducing the wall thickness of the nozzle portion including cylindrical bore 6, i.e., by reducing the amount of copper surrounding cylindrical bore 6. In this way, the temperature differential between the conical bore wall and the cylindrical bore wall can be increased. By way of non-limiting example, the reduced wall thickness of the combined copper wall and tungsten lining can be on the order of 2-3 mm, while the wall thickness for wall of copper alone is at least 3 mm. The only limiting factor is the potential for the water to boil depending upon factors such as the water pressure and temperature as it contacts the copper wall surface of the nozzle in the water outlet groove 16.

According to embodiments, in operation, an average temperature differential between the wall surface of conical bore 5 and the wall surface of cylindrical bore 6 can be greater than 50° C., greater than about 75° C., at least about 100° C., and even greater than about 200° C., and the average temperature differential can be within a range of between 75° C. and 225° C., and preferably between 100° C. and 200° C. In the exemplary embodiment of FIG. 2, nozzle 2' in operation can achieve an average temperature differential between the wall surface of conical bore 5 and the wall surface of cylindrical bore 6 of at least about 100° C. Thus, the combination of the increased heat dissipation through the copper build up over conical bore 5 and the increased velocity of cooling water through the reduced geometry of the cooling channels surrounding conical bore 5 result in increased cooling in the area of conical bore 5. As the cooling water is then guided into wide water outlet groove to act as an insulator around cylindrical bore 6, the heat dissipation is intentionally not commensurate with the cooling in the area of conical bore 5, thereby creating the desired temperature differential between conical bore 5 and cylindrical bore 6. Moreover, if the copper wall thickness surrounding cylindrical bore 6 is reduced, the heat dissipation through the copper wall is reduced to increase the temperature in cylindrical bore 6 and increase the temperature differential.

Figure 3:
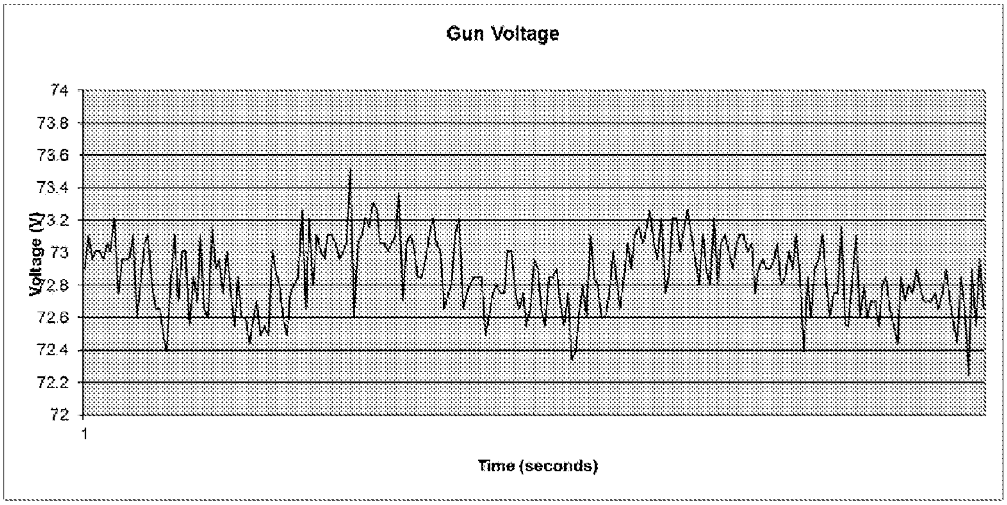
FIG. 3 graphically illustrates gun voltage for the conventional nozzle depicted in FIG. 1.
Figure 4:
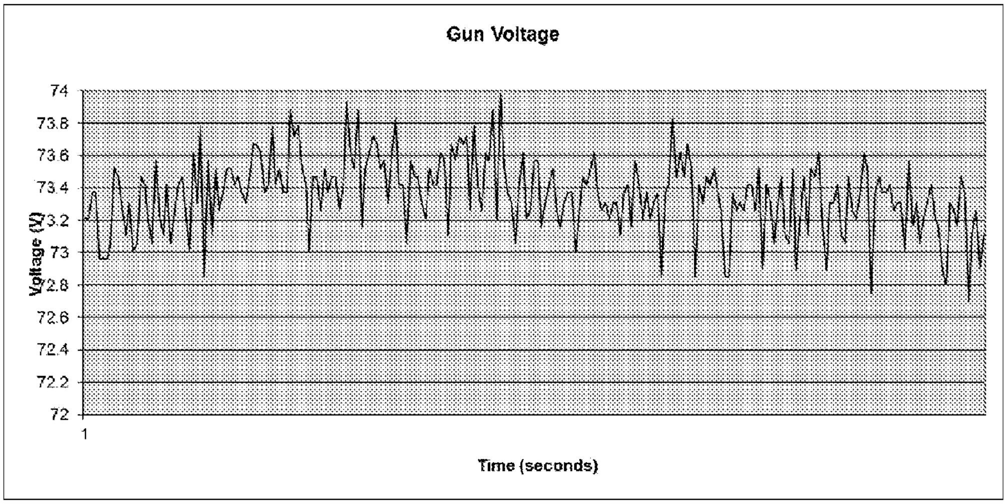
FIG. 4 illustrates gun voltage for the nozzle depicted in FIG. 2.

In operating a plasma gun with nozzle 2', an average 50% increase in hardware life can be yielded in terms of voltage decay as compared to the same gun using conventional nozzle 2. It has also been found that the voltage instability (peak to peak) was essentially unchanged. This result is graphically illustrated in FIGS. 3 and 4, which respectively show, after two hours of operation, the plasma voltage over time for conventional nozzle 2 and the plasma voltage over time for nozzle 2'. FIG. 3 shows a standard deviation of +/−0.22 and FIG. 4 shows a standard deviation of +/−0.23. A review of these graphical results for several examples reveals that the standard deviation remains constant for a longer period of time for nozzle 2' as compared to nozzle 2.

Thus, it is apparent that nozzle 2' in a conventional plasma gun does not affect overall operational behavior of the plasma gun, but does extend the amount of time that the plasma arc will stay within the cylindrical bore, thereby increasing the usable life of the nozzle.

Figure 5:
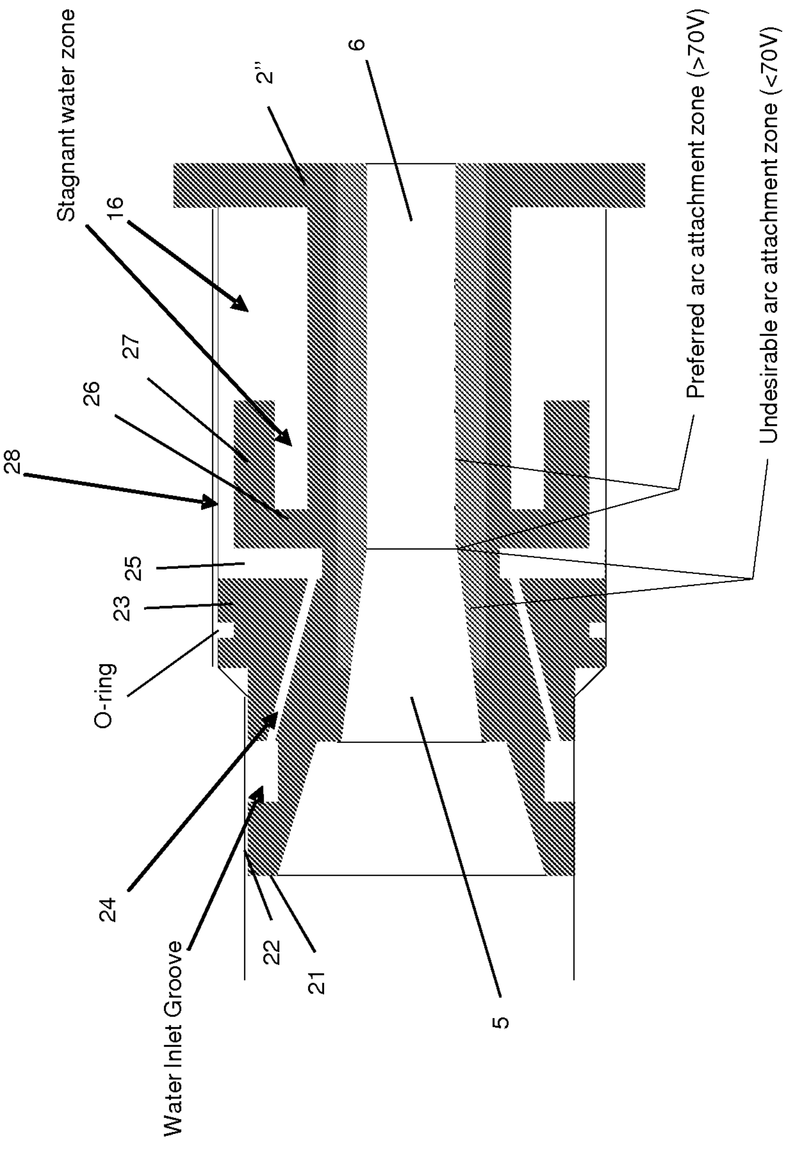
FIG. 5 illustrates another embodiment of a nozzle for use with a plasma spray gun.

In another embodiment, a nozzle 2", as illustrated in FIG. 5, is structured to maximize the thermal state difference between conical bore 5 and cylindrical bore 6. While nozzle 2" is structurally distinct from nozzle 2, the use of nozzle 2" in place of nozzle 2 in the conventional plasma gun does not change the operational characteristics of the plasma gun, except to the extent that the nozzle life is increased with nozzle 2" as compared to nozzle 2. Nozzle 2" includes a build up of copper material 20 so that the added high thermal mass of copper surrounds conical bore 5 to draw off and conduct heat away from the wall of conical bore 5. In particular, the copper build up is provided to radially surround conical bore 5 to such an extent that the outer, and preferably cylindrical, peripheral surfaces 22 and 23 generally correspond with the geometry of the gun bore into which nozzle 2" is to be received. Moreover, cooling channels 24 are formed in the built up amount of copper surrounding conical bore 5 to communicate with one or more radial cooling channels 25. Cooling channels 24 are diagonally oriented to extend from water inlet 8 to a position just radially above the tungsten lining at the point at which conical bore 5 meets cylindrical bore 6.

Nozzle 2" additional includes a circular wall 26 radially extending from outer peripheral surface 13 of cylindrical bore 6 to a cylindrical section 27, which is structured to define a cooling channel 28 between a radial outer surface of cylindrical section 27 and the gun bore of the plasma gun. Further, circular wall 26 partially defines the one or more radial cooling channels 25, which are arranged to communicate with and extend radially outwardly from the end of cooling channels 24 located just radially above the tungsten lining at the point at which conical bore 5 meets cylindrical bore 6.

Cooling channel 24 can be dimensioned so as to increase the velocity of the cooling water at the water inlet port (not shown in FIG. 5), which is conventionally within a range of less than 1-2 m/sec., to within a range of about 10-15 m/sec. Further, radial channels 25 can be dimensioned to be somewhat larger than cooling channels 24 to begin reducing the cooling water velocity as the water is guided through cooling channel 28 and over cylinder surface 27. The cooling water guided over cylinder 27 is collected in a wide water outlet groove 16, which can be understood as a stagnant water zone surrounding peripheral wall 13 of cylinder bore 6. Further, due to a higher pressure drop for the high cooling water velocities achieved, it may be advantageous to insert at least one sealing element, e.g., an O-ring, at peripheral surface 23 of the built up copper to prevent the cooling water from bypassing cooling channels 24.

The increased velocity of cooling water through cooling channels 24 and 25 in combination with the build up of copper, increases the cooling effect in conical bore 5, whereas the insulative effect of the water collecting in the stagnant water zone of wide water outlet groove 16, does not achieve the same cooling effect, so that the beneficial effects of the desired temperature differential between the conical bore 5 and cylindrical bore 6 are achieved.

Figure 6:
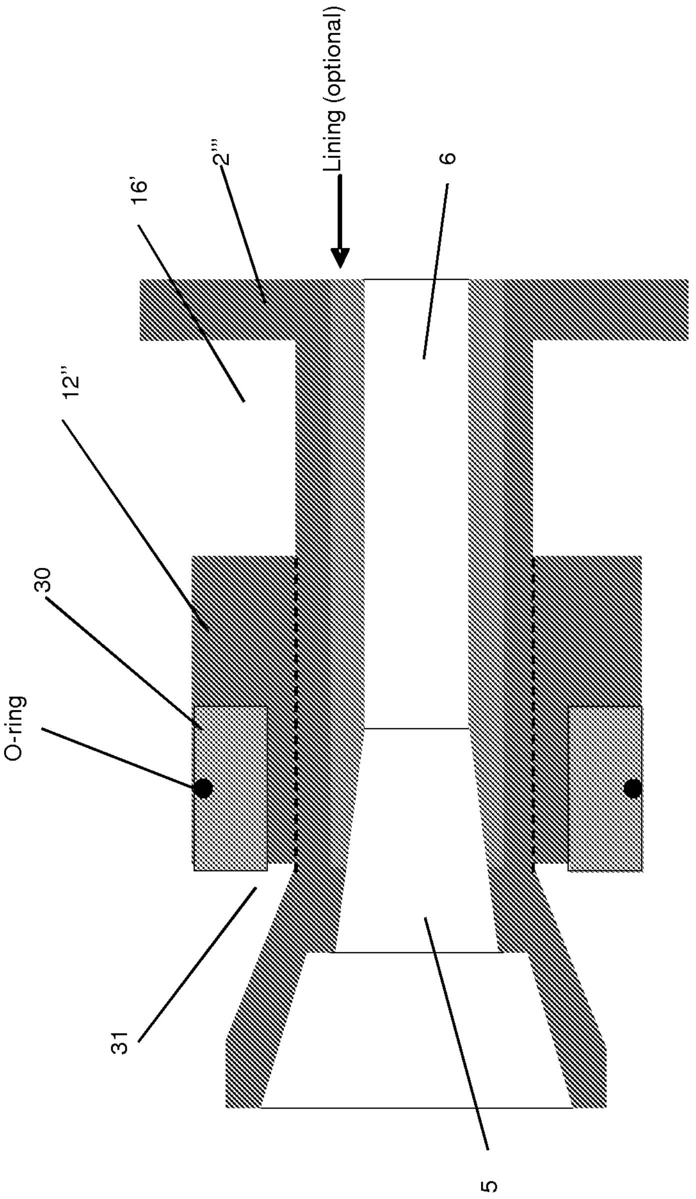
FIG. 6 illustrates still another embodiment of a nozzle for use with a plasma spray gun.

In a further embodiment illustrated in FIG. 6, nozzle 2''' is generally similar to the conventional nozzle, except that a continuous water jacket has been added to increase the cooling water velocity in the region surrounding conical bore 5. Moreover, while nozzle 2''' is structurally distinct from nozzle 2, the use of nozzle 2''' in place of nozzle 2 in the conventional plasma gun does not change the operational characteristics of the plasma gun, except to the extent that the nozzle life is increased with nozzle 2''' as compared to nozzle 2.

As with nozzle 2, nozzle 2''' has a plurality of radially extending fins 12". Fins 12" also extend in a longitudinal direction of nozzle 2 to surround a point at which conical bore 5 and cylindrical bore 6 meet, as well as portions of conical bore 5 and cylindrical portion 6, so that the arc attachment region is surrounded by fins 12". When a tungsten lining is provided, fins 12 can be arranged to extend from a beginning of the lining forming a portion of the wall in conical bore 5 to an end of predetermined arc attachment region surrounding cylindrical bore 6. However, in contrast to fins 12 of nozzle 2, a longitudinally rear and radially outer section, e.g., a rectangular section, is removed from the fins 12". A continuous water jacket 30 of, e.g., copper, brass, steel, other suitable metal or ceramic, can be arranged in the removed section of fins 12" to surround at least the point at which conical bore 5 and cylindrical bore 6 meet and at least a portion of conical bore 5. When a tungsten lining is provided, water jacket 30 may be arranged to extend from a beginning of the lining forming a portion of the wall in conical bore 5 to a point longitudinally beyond the point where conical bore 5 meets cylindrical bore 6.

According to this structure, the generally V-shaped channels between fins 12" are reduced in the radial direction to form reduced geometry generally V-shaped water cooling channels 31 below water jacket 30. As a result, cooling channels 31 can be dimensioned so as to increase the velocity of the cooling water at water inlet 8, which is conventionally within a range of less than 1-2 m/sec., to within a range of about 5 m/sec. Moreover, as the cooling channels 31 radially open up after the cooling water passes water jacket 30, the cooling water velocity is reduced and then further reduced as the cooling water is guided into wide water outlet groove 16' surrounding the portion of cylindrical bore 6 downstream of the plasma arc attachment region. Further, it may be advantageous to insert at least one sealing element, e.g., an O-ring, at an outer peripheral surface of water jacket 30 to prevent the cooling water from bypassing cooling channels 31.

Thus, according to this embodiment, nozzle 2''' concentrates the water flow in a rear section of the nozzle to increase the cooling in the region surrounding conical bore 5 relative to the front section surrounding cylindrical bore 6.

Still further, in operating a typical plasma gun with nozzle 2''', an almost identical result of increased the hardware life was yielded in terms of voltage decay as compared to the same gun using nozzle 2'.

In the disclosed embodiments, the composition of the tungsten liner can include any doped Tungsten material including but not limited to thoriated, lanthanated, ceriated, etc. Other liner material compositions can include high Tungsten alloys such as CMW 3970, molybdenum, silver, and iridium. Both molybdenum and CMW 3970 have been used with some success, while silver and iridium, which are currently somewhat cost prohibitive, can also be considered suitable materials for embodiments of the invention.

Since tungsten lining materials have in the past been known to crack or fracture (and thus reduce hardware life), other materials may offer some improvement in this regard. Such materials should preferably have the following properties. They should be more ductile and fracture tolerant than tungsten especially under high thermal loading and high temperature gradients. They should also have a high melting point similar or close to that of tungsten. And when lower, they should have a high enough thermal conductivity to compensate for having a lower melting point than tungsten. Potential materials include pure metals such as silver, iridium and molybdenum as they have many of the above-noted desired properties. Although, as noted above, silver and iridium are arguably currently too expensive for practical use, molybdenum is affordable. Other options include tungsten alloyed with small amounts of iron or nickel as they have acceptable properties. Preferably, such materials include at least 90% of the primary metal, i.e., tungsten in the case of a tungsten alloy. To select the material, one can graph the differential temperature versus thermal conductivity and determine which it is likely to withstand direct contact with the plasma arc. This differential temperature is preferably the difference between the melting point and average plasma temperature (about 9000 K) and at least an inverse of the melting temperature. When this is performed for the materials discussed above, i.e., molybdenum, iridium, tungsten, copper and silver come closest to having many of the desired properties even while possessing significant differences in regards to ductility, being susceptible to thermal shock and cracking. Preferred materials include tungsten and molybdenum and their alloys such as tungsten containing about 2.1% nickel and about 0.9% iron. Other tungsten alloys include those with higher amounts of nickel and copper, but with lower melting points and thermal conductivity, but higher ductility as well as those with lower amounts of nickel and copper, but with higher melting points and thermal conductivity, but lower ductility. Other materials that can be alloyed with tungsten include osmium, rhodium, cobalt and chromium. These metals possess a high-enough melting point and high thermal conductivity such that they can be alloyed with tungsten and utilized in a nozzle liner material. Commercial grade molybdenum and a tungsten alloy having 2.1% Nickel and 0.9% iron have both been tested and used in nozzle liners by inventors, and have been compared to a copper only nozzle.

It is understood that, while different conventional plasma spray guns may utilize nozzles having dimensions differing from those described in the pending disclosure, it is understood that, without departing from the spirit and scope of the described embodiments for creating or generating the desired surface temperature differential between the conical bore in a rear section of the nozzle and the cylindrical bore in a front section of the nozzle of the invention, the dimensions of the nozzles can be changed or modified from those identified in the above disclosure.

Moreover, in addition to the foregoing embodiments, which describe particular nozzle structures and arrangements to create or generate a surface temperature differential between the conical bore in a rear section of the nozzle and the cylindrical bore in a front section of the nozzle, it is contemplated that this surface temperature differential can be created or generated in other manners without departing from the spirit and scope of the embodiments of the invention. By way of non-limiting example, an embodiment of a nozzle can use alternative materials or layers serving as thermal barriers. In this regard, the thermal barriers can be arranged to control thermal conductivity, so that the rear section has a lower thermal conductivity then the front section. In other embodiments, reducing the thickness of the tungsten lining in the rear section and making the rear section wall thinner to allow for more heat transfer to copper.

It is further understood that, for each of the described embodiments, additional improvement may be obtained by reducing the nozzle wall temperature near the nozzle exit, which would correspondingly limit the arc motion, specifically for high gas flow conditions where the plasma arc tends to travel further downstream in the bore and could attach to the front of the nozzle.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and sprit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A nozzle for a thermal spray gun comprising:

a central bore comprising a conical bore and a cylindrical bore;

the conical bore being delimited by a conical wall surface in a conical bore section;

the cylindrical bore being delimited by a cylindrical wall surface in a cylindrical bore section;

cooling channels surrounding at least a part of the conical bore section and at least a part of the cylindrical bore section; and a coolable peripheral outer wall surface of the cylindrical bore section is located between terminal ends of the cooling channels and a nozzle outlet end, whereby the nozzle is configured so that heat is more rapidly removable from the conical wall surface than from the cylindrical wall surface, and wherein a radial thickness of the conical bore section is greater than that of the cylindrical bore section.

2. The nozzle according to claim 1, wherein the conical bore section and the cylindrical bore section comprise copper.

3. The nozzle according to claim 1, wherein at least part of the conical wall surface and the cylindrical wall surface are formed from one of tungsten, molybdenum, silver or iridium.

4. The nozzle according to claim 1, further comprising a plurality of radially extending fins surrounding the at least part of the conical bore section and the at least a part of the cylindrical bore section, the fins being arranged to form the cooling channels.

5. The nozzle according to claim 4, wherein bases of the cooling channels are radially outside of the outer wall surface of the cylindrical bore section.

6. The nozzle according to claim 4, wherein bases of the cooling channels are radially outside the outer wall surface of the conical bore section.

7. The nozzle according to claim 4, wherein the cooling channels and the coolable peripheral outer wall surface of the cylindrical bore section are parallel to each other.

8. The nozzle according to claim 4, wherein at least a common section of each fin surrounding at least the conical bore section is removed, and the nozzle further comprises a continuous water jacket arranged in the removed common section to form closed water channels over at least the conical bore section.

9. The nozzle according to claim 8, wherein the continuous water jacket comprises at least one of copper, brass, steel, or ceramic.

10. The nozzle according to claim 1, wherein the conical bore section is structured and arranged to convey cooling water through the conical bore section at a greater velocity than through the cylindrical bore section.

11. The nozzle according to claim 1, wherein the cylindrical bore section is structured and arranged so that the cooling water surrounds the outer wall surface of the cylindrical bore section with lower flow in relation to that of the cooling water passing through the cooling channels.

12. A thermal spray gun, comprising:

a nozzle having a conical bore and a cylindrical bore, wherein the nozzle is structured so that, in operation, an average surface temperature of the conical bore is at least about 100° C. cooler than an average surface temperature of the cylindrical bore, and wherein channels are formed in a rear of the nozzle to guide the cooling water through the rear of the nozzle at a velocity greater than at a front of the nozzle.

13. The thermal spray gun according to claim 12, further comprising a cooling water system to supply cooling water at a rear of the nozzle and to remove the cooling water at a front of the nozzle.

14. The thermal spray gun according to claim 13, wherein the conical bore is arranged at a rear of the nozzle and the cylindrical bore is arranged at a front of the nozzle.

15. The thermal spray gun according to claim 13, wherein the front of the nozzle is formed so that the cooling water surrounding the cylindrical bore acts as an insulator.

16. A method of cooling a nozzle in a thermal spray gun, the nozzle having a conical bore and a cylindrical bore, comprising:

supplying, during operation of the thermal spray gun, cooling water from a rear of the nozzle toward a front of the nozzle, at which an exit opening is located, to cool wall surface temperatures of the conical bore and a cylindrical bore, wherein the front and rear of the nozzle are structured so that heat is removed more rapidly from a wall surface of the conical bore than from a wall surface of the cylindrical bore, and wherein the cooling water is supplied along at least one surface surrounding the conical section at a velocity greater than the cooling water is supplied along at least one surface surrounding the cylindrical section.

17. The method according to claim 16, wherein an average wall surface temperature of the conical bore is at least about 100° C. cooler than an average wall surface temperature of the cylindrical bore.

* * * * *